United States Patent [19]

Peiffer et al.

[11] Patent Number: 6,054,212
[45] Date of Patent: Apr. 25, 2000

[54] TRANSPARENT POLYESTER FILM WITH HIGH OXYGEN BARRIER, ITS USE, AND PROCESS FOR ITS PRODUCTION

[75] Inventors: Herbert Peiffer, Mainz; Werner Roth, Eppstein; Guenter Crass, Taunusstein-Wehen, all of Germany

[73] Assignee: Mitsubishi Polyester Film GmbH, Wiesbaden, Germany

[21] Appl. No.: 09/079,239

[22] Filed: May 14, 1998

[30] Foreign Application Priority Data

May 15, 1997 [DE] Germany .......................... 197 20 506

[51] Int. Cl.⁷ ...................................................... B23B 5/16
[52] U.S. Cl. .......................... 428/336; 428/195; 428/332; 428/334; 428/212; 428/213; 428/215; 428/216; 428/423.7
[58] Field of Search ..................... 428/332–337, 428/304.4, 212, 213, 215, 216, 423.7; 264/290.2, 173.15, 235, 346

[56] References Cited

U.S. PATENT DOCUMENTS 3,880,966 4/1975 Zimmerman et al. ..................... 264/25
5,795,528 8/1998 Klein et al. .......................... 264/290.2

FOREIGN PATENT DOCUMENTS 0 602 964 A1  6/1994  European Pat. Off. .

*Primary Examiner*—William Krynski
*Assistant Examiner*—Hong J. Xu

[57] ABSTRACT

The application discloses a transparent, biaxially oriented polyester film having a base layer of at least 80% by weight which is composed of at least a thermoplastic polyester, and having at least one cover layer, wherein the cover layer is composed of a polymer or a mixture of polymers which comprises at least 40% by weight of ethylene 2,6-naphthalate units and optionally up to 60% by weight of ethylene terephthalate units and/or optionally units from aliphatic, cycloaliphatic or aromatic diols, and/or optionally aliphatic, cycloaliphatic and aromatic dicarboxylic acids, with the proviso that the $T_g2$ value of the polyester film is above the $T_g2$ value of the base layer but below the $T_g2$ value of the cover layer. The film has low atmospheric oxygen transmission. It is particularly suitable for packaging applications, specifically for packaging foodstuffs and other consumable items.

17 Claims, No Drawings

TRANSPARENT POLYESTER FILM WITH HIGH OXYGEN BARRIER, ITS USE, AND PROCESS FOR ITS PRODUCTION

BACKGROUND OF THE INVENTION

1) Field of the Invention

The invention relates to a transparent, biaxially oriented polyester film having a base layer of at least 80% by weight based on the total weight of the base layer of at least a thermoplastic polyester, and having a cover layer. The invention furthermore relates to the use of the film and to a process for its production.

2) Prior Art

In many food and drink packaging applications, there is demand for a high barrier effect with respect to gases, water vapor and flavors. For this reason, use is usually made of polypropylene films which are metallized or coated with polyvinylidene chloride (PVDC). However, metallized polypropylene films are not transparent and are therefore not used in cases where the view of the contents is likely to have added promotional effect. Although films coated with PVDC are transparent, the coating, like the metallizing, takes place in a second operation which makes the packaging markedly more expensive. Ethylene-vinyl alcohol copolymers (EVOH) likewise exhibit a strong barrier effect. However, films modified with EVOH are particularly highly sensitive to moisture, and this limits their range of application. In addition, because of their poor mechanical properties they have relatively high thickness or have to be laminated with other materials at high cost, and they are also difficult to dispose of after use. In addition to this, some raw materials are not approved by the authorities or are unsuitable for producing food and drink packaging.

It is therefore an object of the present invention to provide a transparent, biaxially oriented polyester film which can be produced simply and cost-effectively, which has the good physical properties of the known films and which does not give rise to disposal problems.

SUMMARY OF THE INVENTION

In the briefest sense, the present invention relates to a polyester film having a base layer and a cover layer. The base layer contains at least 80% by weight based on the total weight of the base layer of at least one thermoplastic polyester (the remaining 20% by weight being the same or different polymer). The cover layer comprises at least 5% by weight of ethylene 2,6-naphthalate units, with the proviso that the $T_g2$ value of the polyester film is above the $T_g2$ value of the base layer, but below the $T_g2$ value of the cover layer. Preferably, the cover layer comprises at least 40% by weight of ethylene 2,6-naphthalate units.

DESCRIPTION OF THE EMBODIMENTS

The object of the present invention is achieved by means of a biaxially oriented polyester film having a base layer of at least 80% by weight based on the total weight of the base layer of at least a thermoplastic polyester, and having at least one cover layer, wherein the film has (a) cover layer(s) composed of a polymer or a mixture of polymers which comprises at least 40% by weight of ethylene 2,6-naphthalate units; and optionally 0% up to 40% by weight of ethylene terephthalate units; and/or optionally 0% up to 60% of units from aliphatic, cycloaliphatic, or aromatic diols, and/or optionally aliphatic, cycloaliphatic, or aromatic dicarboxylic acids; with the proviso that the $T_g2$ value of the polyester film is above the $T_g2$ value of the base layer but below the $T_g2$ value of the cover layer. The novel film generally has an oxygen permeability of less than about 80 $cm^3/m^2$ bar d, (80 cubic centimeters of oxygen per square meter and per day diffusion through the film when it is exposed to air at a pressure of 1 bar) preferably less than 75 $cm^3/m^2$ bar d, particularly preferably less than 70 $cm^3/m^2$ bar d.

Preference is given to a polyester film in which the polymers of the cover layer comprise at least 65% by weight of ethylene 2,6-naphthalate units and up to 35% by weight of ethylene terephthalate units. Among these, particular preference is then given to a polyester film of this type in which the polymers of the cover layer comprise at least 70% by weight of ethylene 2,6-naphthalate units and up to 30% by weight of ethylene terephthalate units. The cover layer may, however, also be composed completely of ethylene 2,6-naphthalate polymers.

Examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol), branched aliphatic glycols having up to 6 carbon atoms, and cycloaliphatic diols having one or more rings and if desired containing heteroatoms. Among the cycloaliphatic diols, mention may be made of cyclohexanediols (in particular 1,4-cyclohexanediol). Examples of other suitable aromatic diols are those of the formula HO—$C_6H_4$—X—$C_6H_4$—OH where X is —$CH_2$—, —$C(CH_3)_2$—, —$C(CF_3)_2$—, —O—, —S— or —$SO_2$—. Besides these, bisphenols of the formula HO—$C_6H_4$—$C_6H_4$—OH are also very suitable. Preferred aromatic dicarboxylic acids are benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids, mention should be made of cyclohexanedicarboxylic acids (in particular cyclohexane-1,4-dicarboxylic acid). Among the aliphatic dicarboxylic acids, the $C_3$-$C_{19}$-alkanedioic acids are particularly suitable, where the alkane moiety may be straight-chain or branched.

The present invention also provides a process for producing this film. It encompasses a) producing a film from base and cover layer(s) by coextrusion, b) biaxial orientation of the film and c) heat-setting of the oriented film.

To produce the cover layer, it is expedient to feed granules of polyethylene terephthalate and polyethylene 2,6-naphthalate to an extruder in the desired mixing ratio. At about 300° C. and with a residence time of about 5 min, the two materials can be melted and can be extruded. Under these conditions, transesterification reactions can occur in the extruder and copolymers are formed from the homopolymers.

The polymers for the base layer are expediently fed in via another extruder. Any foreign bodies or contamination which may be present can be filtered off from the polymer melt before extrusion. The melts are then extruded through a coextrusion die to give flat melt films and are layered one upon the other. The coextruded film is then drawn off and solidified with the aid of a chill roll and other rolls if desired.

The biaxial orientation is generally carried out sequentially. For this, it is preferable to orient firstly in a longitudinal direction (i.e. in the machine direction) and then in a transverse direction (i.e. perpendicularly to the machine direction). This causes an orientation of the molecular chains. The orientation in a longitudinal direction may be carried out with the aid of two rolls running at different speeds corresponding to the stretching ratio to be achieved. For the transverse orientation, use is generally made of an appropriate tenter frame.

The temperature at which the orientation is carried out can vary over a relatively wide range and depends on the properties desired in the film. In general, the longitudinal stretching is carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1.

During the subsequent heat-setting, the film is held for from 0.1 to 10 s at a temperature of from 150 to 250° C. The film is then wound up in a conventional manner.

A great advantage of this process is that it is possible to feed the extruder with granules, which do not block the machine.

The base layer of the film is preferably composed of at least 90% by weight of the thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), and also from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed to an extent of at least 90 mol %, preferably at least 95 mol %, of ethylene glycol units and terephthalic acid units or of ethylene glycol units and naphthalene-2,6-dicarboxylic acid units. The remaining monomer units are derived from other diols and/or dicarboxylic acids. Examples of suitable diol comonomers are diethylene glycol, triethylene glycol, aliphatic glycols of the formula HO—$(CH_2)_n$—OH, where n is an integer from 3 to 6, branched aliphatic glycols having up to 6 carbon atoms, aromatic diols of the formula HO—$C_6H_4$—X—$C_6H_4$—OH where X is —$CH_2$—, —$C(CH_3)_2$—, —$C(CF_3)_2$—, —O—, —S— or —$SO_2$—, or bisphenols of the formula HO—$C_6H_4$—$C_6H_4$—OH.

The dicarboxylic acid comonomer units are preferably derived from benzenedicarboxylic acids, naphthalenedicarboxylic acids, biphenyl-x,x'-dicarboxylic acids (in particular biphenyl-4,4'-dicarboxylic acid), cyclohexanedicarboxylic acids (in particular cyclohexane-1,4-dicarboxylic acid), diphenylacetylene-x,x'-dicarboxylic acids (in particular diphenylacetylene-4,4'-dicarboxylic acid), stilbene-x,x'-dicarboxylic acid or $C_1$–$C_{16}$-alkanedicarboxylic acids, where the alkane moiety may be straight-chain or branched.

The polyesters may be prepared by the transesterification process. The starting materials for this are dicarboxylic esters and diols, which are reacted using the customary transesterification catalysts, such as salts of zinc, of calcium, of lithium and of manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

For processing the polymers, it has proven useful to select the polymers for the base layer and the cover layer(s) in such a way that the viscosities of the respective polymer melts do not differ excessively. Otherwise it is likely that there will be flow disturbances or streaks on the finished film. To describe the viscosity ranges of the two melts, use is made of a modified solution viscosity (SV). For commercially available polyethylene terephthalates which are suitable for producing biaxially oriented films, the SVs are in the range from 600 to 1000. To ensure satisfactory film quality, the SV of the copolymers for the cover layer should be in the range from 500 to 1200. If desired, a solid phase condensation may be carried out on the respective granules in order to adjust the SVs of the materials as necessary. It is a general rule that the SVs of the polymer melts for base and cover layer(s) should differ by not more than 200, preferably not more than 100.

The polymers for the cover layer may be prepared in three different ways:

a) In copolycondensation, terephthalic acid and naphthalene-2,6-dicarboxylic acid are placed in a reactor together with ethylene glycol, and polycondensed to give a polyester, using the customary catalysts and stabilizers. The terephthalate and naphthalate units are then randomly distributed in the polyester.

b) Polyethylene terephthalate (PET) and polyethylene 2,6-naphthalate (PEN), in the desired ratio, are melted together and mixed, either in a reactor or preferably in a melt kneader (twin-screw kneader) or in an extruder. Immediately after the melting, transesterification reactions between the polyesters begin. Initially, block copolymers are obtained, but as reaction time increases—depending on the temperature and mixing action of the agitator—the blocks become smaller, and long reaction times give a random copolymer. However, it is not necessary and also not always advantageous to wait until a random distribution has been achieved, since the desired properties are also obtained with a block copolymer. The resultant copolymer is then extruded from a die and granulated.

c) PET and PEN are mixed as granules in the desired ratio, and the mixture is introduced to the extruder for the cover layer. Here, the transesterification to give the copolymer takes place directly during the production of the film. This process has the advantage of being very cost-effective, and generally gives block copolymers, the block length being dependent on the extrusion temperature, the mixing action of the extruder and the residence time in the melt.

In a preferred embodiment of the invention, from 0.1 to 20% by weight of the polymers of the base layer are identical with those of the cover layer. These are either directly admixed with the base layer during extrusion or are in any case present in the film due to addition of rework. The proportion of these copolymers in the base layer is selected in such a way that the base layer has crystalline character.

In another embodiment, the film encompasses, on the side facing away from the cover layer, another cover layer of polyethylene terephthalate, and this layer contains pigments.

The novel film exhibits a surprisingly high oxygen barrier. If, in contrast, the polymers used for the cover layer(s) comprise less than 40% by weight of ethylene 2,6-naphthalate units and more than 40% by weight of ethylene terephthalate units, then in many cases, although the film has somewhat lower oxygen transmission than a standard polyester film (composed to an extent of 100% by weight of polyethylene terephthalate), the transmission is still much too high. It has even been found that the oxygen barrier is poorer than in a standard polyester film if the cover layer comprises from 30 to 40% by weight of ethylene 2,6-naphthalate units and from 60 to 70% by weight of ethylene terephthalate units. However, even under these circumstances there may be advantage in a film having a cover layer which comprises from 5 to 40% by weight of ethylene 2,6-naphthalate units and more than 40% by weight of ethylene terephthalate units, if the oxygen barrier does not play a decisive part in the application concerned (such as for non-food packaging).

In the novel films, moreover, the glass transition temperature $T_g$ of the (co)polymer or of the (co)polymers of the cover layer(s) differs from the prior art in being higher than the glass transition temperature $T_g$ of the polymers of the base layer. The glass transition temperature of the (co) polymers used for the cover layer(s) is preferably in the range from 80 to 100° C. In the DSC (Differential Scanning Colorimetry) determination of the glass transition temperatures, the transitions of the two layers cannot be differentiated.

Glass transitions which are determined on biaxially oriented, heat-set films in the first heating procedure (termed $T_g1$ below) are, due to crystallinity and also to molecular stresses in the amorphous fraction of the specimens, relatively small in size, distributed over a wide temperature range, and shifted to higher temperatures. Because of orientation effects in particular, they are not suitable for characterizing a polymer. The resolution of DSC analyzers is often insufficient to detect the glass transitions in the first heating procedure ($T_g1$) of the individual layers of the novel film, the transitions being "blurred" and small, due to orientation and crystallinity. If the specimens are melted and then rapidly cooled again to below their glass transition temperature (quenched), the orientation effects are eliminated. On renewed heating, glass transitions (designated $T_g2$ here) are then measured which have a greater intensity and are characteristic of the respective polymers. However, even here it is not possible to differentiate the glass transitions of the individual layers, since the layers mix on melting and the polyesters present therein enter into transesterification reactions with one another. It is fully sufficient, however, to compare the $T_g2$ of the entire coextruded films with the $T_g2$ of the polymer used for the base layer. In known films the $T_g2$ value of the base layer is higher than that of the coextruded film, whereas the $T_g2$ value of the cover layer is lower than that of the base layer and also than that of the coextruded film. Exactly the opposite of this applies for the novel film. Here, the $T_g2$ value of the coextruded film is higher than that of the base layer but lower than the $T_g2$ value of the cover layer.

The base layer and the cover layer(s) may, in addition, contain customary additives, such as stabilizers and antiblocking agents. They are expediently added to the polymer or to the polymer mixture before melting takes place. Examples of stabilizers are phosphorus compounds, such as phosphoric acid and phosphoric esters. Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, alumina, LiF, the calcium, barium, zinc and manganese salts of the dicarboxylic acids used, carbon black, titanium dioxide, kaolin, crosslinked polystyrene particles and crosslinked acrylate particles.

The additives selected may also be mixtures of two or more different antiblocking agents or mixtures of antiblocking agents of the same makeup but of different particle size. The particles may be added to the individual layers in the customary concentrations, e.g. as glycolic dispersion during the polycondensation or via masterbatches during extrusion. Pigment concentrations of from 0.0001 to 5% by weight have proven particularly suitable. A detailed description of the antiblocking agents is found, for example, in EP-A-0 602 964.

The film may be coated and/or corona- or flame-pretreated to establish other desired properties. Typical coatings are layers which promote adhesion, are antistatic, improve slip or have release action. These additional layers may be applied to the film by in-line coating using aqueous dispersions, before the transverse orientation.

The novel polyester film preferably also contains a second cover layer. The structure, thickness and make-up of a second cover layer may be selected independently of the cover layer already present, and the second cover layer may likewise comprise the abovementioned polymers or polymer mixtures, but these do not necessarily have to be identical with those of the first cover layer. The second cover layer may also comprise other commonly used cover layer polymers.

Between the base layer and the cover layer(s), there may also be an intermediate layer if desired. It may be composed of the polymers described for the base layers. In a particularly preferred embodiment, it is composed of the polyester used for the base layer. It may also contain the customary additives described. The thickness of the intermediate layer is generally greater than 0.3 μm and is preferably in the range from 0.5 to 15 μm, in particular from 1.0 to 10 μm.

The thickness of the cover layer(s) is generally greater than 0.1 μm and is preferably in the range from 0.2 to 5 μm, in particular from 0.2 to 4 μm, and it is possible for the cover layers to have identical or different thicknesses.

The total thickness of the novel polyester film may vary within wide limits and depends on the application envisaged. It is preferably from 4 to 100 μm, in particular from 5 to 50 μm, preferably from 6 to 30 μm, the base layer preferably representing a proportion of from about 40 to 90% of the total thickness.

A further advantage is that the production costs of the novel film are only insignificantly greater than those of a film made from standard polyester raw materials. The other properties of the novel film which are relevant to processing and use remain essentially unchanged or are even improved. In addition, it has been ensured that rework can be used in a concentration of up to 50% by weight, preferably from 10 to 50% by weight, based on the total weight of the film in each case, in the production of the film without significant adverse effect on its physical properties.

The film has excellent suitability for packaging foodstuffs and other consumable items.

The following methods were used to characterize the raw materials and the films:

The oxygen barrier was measured using a Mocon Modern Controls (USA) OX-TRAN 2/20 in accordance with DIN 53 380, Part 3.

The SV (solution viscosity) was determined by dissolving a specimen of polyester in a solvent (dichloroacetic acid). The viscosity of this solution and that of the pure solvent were measured in an Ubbelohde viscometer. The quotient was determined from the two values, 1000 was subtracted from this, and the value multiplied by 1000. The result was the SV.

The coefficient of friction was measured according to DIN 53 375, 14 days after production.

Surface tension was measured using the "ink method" (DIN 53 364).

The haze of the film was measured in accordance with ASTM-D 1003-52. The Hölz haze was determined by a method based on ASTM-D 1003-52, but in order to utilize the most effective measurement range, measurements were made on four pieces of film laid one on top of the other, and a 1° slit diaphragm was used instead of a 4° pinhole.

Gloss was measured in accordance with DIN 67 530. The reflectance was measured as a characteristic optical value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photo-electric detector. The value measured is dimensionless and must be stated together with the angle of incidence.

The glass transition temperatures $T_g1$ and $T_g2$ were measured using film samples with the aid of DSC (Differential Scanning Calorimetry). Use was made of a DuPont DSC 1090. The heating rate was 20 K/min and the specimen weight was about 12 mg. In the first heating procedure, the glass transition $T_g1$ was determined. Many of the specimens showed an enthalpy relaxation (a peak) at the beginning of the step-like glass transition. The temperature taken as $T_g1$ was that at which the step-like change in heat capacity—without reference to the peak-shaped enthalpy relaxation achieved half of its height in the first heating procedure. In all cases, there was only a single glass transition stage in the thermogram in the first heating procedure. It is possible that the peak-shaped enthalpy relaxations obscured the fine structure of the step, or that the resolution of the device was not adequate to separate the small, "blurred" transitions of oriented, crystalline specimens. To eliminate their heat history, the specimens were held at 300° C. for 5 minutes after the heating procedure, and then quenched with liquid nitrogen. The temperature for the glass transition $T_g2$ was taken as the temperature at which the transition reached half of its height in the thermogram for the second heating procedure.

The following examples illustrate the invention. The products used (trademarks and companies) are given only once in each case, and then relate to the examples which follow.

EXAMPLE 1

The polymer for the cover layer was prepared by copolycondensation. For this, dimethyl terephthalate and 2,6-dimethyl naphthalenedicarboxylate were mixed in a reactor in a molar ratio of 0.54:1.00 (corresponding to a make-up of 30% by weight of ethylene terephthalate units and 70% by weight of ethylene 2,6-naphthalate units in the final copolymer), and then mixed with ethylene glycol and, as catalyst, 300 ppm of manganese acetate. The transesterification was carried out with stirring at from 160 to 250° C., at atmospheric pressure, and the methanol obtained during this process was distilled off. An equimolar amount of phosphoric acid, as stabilizer, and 400 ppm of antimony trioxide, as catalyst, were then added. The polycondensation was carried out with stirring at 280° C. and a pressure of less than 1 mbar. The molecular weight achieved could be determined by measuring the torque on the stirrer. After the reaction, nitrogen pressure was used to discharge the melt from the reactor, and it was then pelletized.

EXAMPLE 2

Commercially available polyethylene terephthalate pellets and polyethylene 2,6-naphthalate pellets were used. In each case, the pellets were crystallized and dried for about 4 h at a temperature of about 160° C. The two materials in a ratio of 30:70 (30% by weight of polyethylene terephthalate and 70% by weight of polyethylene 2,6-naphthalate) were then placed in a mixer, where they were homogenized by stirring. The mixture was then passed to a twin-screw compounder (ZSK from Werner and Pfleiderer, Stuttgart), where it was extruded at a temperature of about 300° C. and with a residence time of about 3 min. The melt was extruded and chipped. A copolymer was produced in the extrusion by reaction between the polyethylene terephthalate and polyethylene 2,6-naphthalate.

EXAMPLE 3

Example 2 was repeated, but, for production of the film, chips of polyethylene terephthalate and of polyethylene 2,6-naphthalate were fed in a mixing ratio of 3:7 directly to the single-screw extruder, where the two materials were extruded at about 300° C. The melt was filtered and extruded through a coextrusion die to give a flat film, and laid as cover layer onto the base layer. The coextruded film was discharged across the die lip and solidified on a chill roll. The residence time of the two polymers in the extrusion was about 5 min. Further steps were as given above. Here, too, the copolymer was produced in the extrusion under the conditions given.

EXAMPLE 4

Chips of polyethylene terephthalate were dried at 160° C. to a residual moisture of less than 50 ppm and fed to the extruder for the base layer. Besides this, chips of polyethylene terephthalate and polyethylene 2,6-naphthalate (in a weight ratio of 3:7) were likewise dried at 160° C. to a residual moisture of 50 ppm and fed to the two extruders for the cover layers. The extruder conditions for the cover layers were as in Example 3.

A transparent three-layer film of symmetrical structure and an overall thickness of 12 μm was then produced by coextrusion followed by stepwise orientation in the longitudinal and transverse directions. Each of the cover layers has a thickness of 2.0 μm.

Base layer:

95% by weight of polyethylene terephthalate (RT 49 from Hoechst AG) with an SV of 800 and 5% by weight of masterbatch made from 99% by weight of polyethylene terephthalate and 1.0% by weight of silica particles (®Sylobloc 44 H from Grace) having an average particle size of 4.5 μm.

Cover layers:

70% by weight of polyethylene 2,6-naphthalate (®Polyclear N 100 prepolymer from Hoechst AG) with an SV of 800, 20% by weight of polyethylene terephthalate having an SV of 800 and 10% by weight of masterbatch made from 99.0% by weight of polyethylene terephthalate and 1.0% by weight of silica particles having an average particle size of 2.0 μm.

The individual steps were:

| Extrusion | Temperatures: | |
|---|---|---|
| | Cover layer: | 300° C. |
| | Base layer: | 300° C. |
| | Temperature of the take-off roll: | 30° C. |
| | Die gap width: | 1 mm |
| | Temperature of the take-off roll: | 30° C. |
| Longitudinal stretching | Temperature: | 85–135° C. |
| | Longitudinal stretching ratio: | 4.0:1 |
| Transverse stretching | Temperature: | 85–135° C. |
| | Longitudinal stretching ratio: | 4.0:1 |
| Setting | Temperature: | 230° C. |

The film had the required oxygen barrier.

EXAMPLE 5

In a manner similar to that of Example 4, a three-layer film having an overall thickness of 12 µm was produced by coextrusion. The cover layer A had a thickness of 2.0 µm, the cover layer C a thickness of 1.5 µm.

Base layer:
100% by weight of polyethylene terephthalate having an SV of 800

Cover layer A:
70% by weight of polyethylene 2,6-napthalate having an SV of 800,
20% by weight of polyethylene terephthalate having an SV of 800 and
10% by weight of masterbatch made from 99.0% by weight of polyethylene terephthalate and 1.0% by weight of silica particles having an average particle size of 2.0 µm.

Cover layer C:
80% by weight of polyethylene terephthalate having an SV of 800 and
20% by weight of masterbatch made from 99.0% by weight of polyethylene terephthalate and 1.0% by weight of silica particles, 50% of which had an average particle size of 2.5 µm and 50% of which had an average particle size of 1.0 µm.

The process conditions for all layers were as in Example 4.

EXAMPLE 6

A coextruded film having the recipe of Example 5, where cover layer A was 2.0 µm thick and had the following make-up:

90% by weight of polyethylene 2,6-napthalate having an SV of 800 and
10% by weight of masterbatch made from 99.0% by weight of polyethylene terephthalate and 1.0% by weight of silica particles having an average particle size of 1.0 µm, was produced under the process conditions of Example 4.

EXAMPLE 7

A coextruded film having the recipe of Example 5, where cover layer A was 2.5 µm thick and had the following make-up:

90% by weight of polyethylene 2,6-napthalate having an SV of 800 and
10% by weight of masterbatch made from 99.0% by weight of polyethylene 2,6-naphthalate having an SV of 800 and 1.0% by weight of silica particles having an average particle size of 1.0 µm, was produced under the process conditions of Example 4, but the temperatures of longitudinal and transverse stretching were now raised by about 10° C.

EXAMPLE 8

A three-layer coextruded film having a base layer and two cover layers was produced in a manner similar to that of Example 5. The overall thickness of the film was 12 µm. Cover layer A had a thickness of 3 µm, and cover layer C of 1.5 µm.

Base layer:
100% by weight of polyethylene terephthalate having an SV of 800

Cover layer A:
100% by weight of polyethylene 2,6-naphthalate with an SV of 800

Cover layer C:
80% by weight of polyethylene terephthalate having an SV of 800 and
20% by weight of masterbatch made from 99.0% by weight of polyethylene terephthalate and 1.0% by weight of silica particles, 50% of which had an average particle size of 2.5 µm and 50% of which had an average particle size of 1.0 µm.

The process conditions for all layers were as given in Example 7.

EXAMPLE 9

A coextruded film was produced in a manner similar to that of Example 4, but the copolymer for the cover layers was now prepared as in Example 2. In other respects, the conditions corresponded to those in Example 4.

EXAMPLE 10

A coextruded film was produced in a manner similar to that of Example 4, but the copolymer for the cover layers was now prepared as in Example 1. In other respects, the conditions corresponded to those in Example 4.

EXAMPLE 11

A coextruded two-layer film having a base layer and a cover layer was produced in a manner similar to that of Example 4. The overall thickness of the film was 12 µm, the cover layer having a thickness of 3 µm.

Base layer:
80% by weight of polyethylene terephthalate having an SV of 800 and
20% by weight of masterbatch made from 99.0% by weight of polyethylene terephthalate and 1.0% by weight of silica particles, 50% of which had an average particle size of 2.5 µm and 50% of which had an average particle size of 1.0 µm.

Cover layer:
60% by weight of polyethylene naphthalate having an SV of 800,
30% by weight of polyethylene terephthalate having an SV of 800 and
10% by weight of masterbatch made from 99.0% by weight of polyethylene terephthalate and 1.0% by weight of silica particles having an average particle size of 2.0 µm.

The process conditions for all layers were as given in Example 4.

EXAMPLE 12

A three-layer film was produced as described in Example 7, but with the single exception that the thickness of cover layer A was only 1.0 μm.

EXAMPLE 13

A film was produced in a manner similar to that of Example 11. For cover layer A, however, use was made of a copolyester of 82% by weight of ethylene terephthalate and 18% by weight of ethylene isophthalate.

EXAMPLE 14

A film was produced in a manner similar to that of Example 11. For cover layer A, use was now made of a polymer mixture of 50% by weight of ethylene terephthalate and 50% by weight of ethylene 2,6-naphthalate.

EXAMPLE 15

A film was produced in a manner similar to that of Example 11. For cover layer A, use was now made of a polymer mixture of 70% by weight of ethylene terephthalate and 30% by weight of ethylene 2,6-naphthalate.

EXAMPLE 16

A film was produced in a manner similar to that of Example 11. For cover layer A, use was now made of a polymer mixture of 90% by weight of ethylene terephthalate and 10% by weight of ethylene 2,6-naphthalate.

EXAMPLE 17

A single-layer PET film was produced with the following layers:

Insert (D)

80% by weight of polyethylene terephthalate having an SV of 800 and

20% by weight of masterbatch made from 99.0% by weight of polyethylene terephthalate and 1.0% by weight of silica particles, 50% of which had an average particle size of 2.5 μm and 50% of which had an average particle size of 1.0 μm

EXAMPLE 18

A single-layer PEN film was produced with the following make-up:

80% by weight of polyethylene 2,6-naphthalate having an SV of 1000 and

20% by weight of masterbatch made from 99.0% by weight of polyethylene 2,6-naphthalate and 1.0% by weight of silica particles, 50% of which had an average particle size of 2.5 μm and 50% of which had an average particle size of 1.0 μm;

The film of Example 18 had very good barrier properties; however, due to high production costs it is unsuitable for food and drink packaging.

The properties of the films produced in Examples 4 to 18 are given in Table 2. Films from Examples 4–12 had good oxygen barrier properties. Films 13–17 were not useful where oxygen barrier is a key consideration. However, films 13–17 are useful for non-food packaging applications, for example.

TABLE 1

| Example No. | Ethylene 2,6-naphthalate units in cover layer A (in % by weight) | Ethylene terephthalate units in cover layer A (in % by weight) | Ethylene isophthalate units in cover layer A (in % by weight) |
|---|---|---|---|
| 4 | 70 | 30 | 0 |
| 5 | 70 | 30 | 0 |
| 6 | 90 | 10 | 0 |
| 7 | 100 | 0 | 0 |
| 8 | 100 | 0 | 0 |
| 9 | 70 | 30 | 0 |
| 10 | 70 | 30 | 0 |
| 11 | 60 | 40 | 0 |
| 12 | 100 | 0 | 0 |
| 13 | 0 | 82 | 18 |
| 14 | 50 | 100 | 0 |
| 15 | 30 | 0 | 0 |
| 16 | 10 | 50 | 0 |
| 17 | 100 | 0 | 0 |
| 18 | 0 | 100 | 0 |

TABLE 2

| Example No. | Film thickness (μm) | Cover layer thickness (A/C(A) μm) | Film structure | Oxygen permeability ($cm^3/m^2$ bar d) | Gloss (60° angle of measurement) Side A | Side C | Haze |
|---|---|---|---|---|---|---|---|
| 4 | 12 | 2.0/2.0 | ABA | 70 | 175 | 175 | 2.5 |
| 5 | 12 | 2.0/1.5 | ABC | 80 | 174 | 175 | 2.6 |
| 6 | 12 | 2.0/1.5 | ABC | 65 | 176 | 175 | 2.5 |
| 7 | 12 | 2.5/1.5 | ABC | 55 | 155 | 155 | 4.0 |
| 8 | 12 | 3.0/1.5 | ABC | 45 | 160 | 155 | 4.0 |
| 9 | 12 | 2.0/2.0 | ABA | 70 | 175 | 175 | 2.5 |
| 10 | 12 | 2.0/2.0 | ABA | 70 | 175 | 175 | 2.5 |
| 11 | 12 | 3.0 | AB | 80 | 175 | 178 | 1.5 |
| 12 | 12 | 1.0/1.0 | ABC | 62 | 160 | 165 | 3.5 |
| 13 | 12 | 3.0 | AB | 102 | 145 | 160 | 3.0 |
| 14 | 12 | 3.0 | AB | 115 | 120 | 150 | 6.5 |
| 15 | 12 | 3.0 | AB | 110 | 120 | 150 | 6.5 |
| 16 | 12 | 3.0 | AB | 95 | 175 | 175 | 1.5 |
| 17 | 12 | 0 | A | 100 | 175 | 178 | 4.0 |
| 18 | 12 | 0 | A | 30 | 175 | 178 | 4.0 |

What is claimed is:

1. A transparent, biaxially oriented polyester film having a base layer of at least 80% by weight based on the total weight of the base layer of at least one thermoplastic polyester, and having at least one cover layer, wherein the cover layer is composed of a polymer or a mixture of polymers which comprises at least 50% by weight of ethylene 2,6-naphthalate units; and ethylene terephthalate units at up to 40% by weight; and 0% up to 60% by weight of units from aliphatic, cycloaliphatic or aromatic diols, and/or optionally aliphatic, cycloaliphatic, or aromatic dicarboxylic acids; with the proviso that the $T_g2$ value of the polyester film is above the $T_g2$ value of the base layer but below the $T_g2$ value of the cover layer.

2. A film as claimed in claim 1, wherein the cover layer comprises at least 65% by weight of ethylene 2,6-naphthalate units.

3. A film as claimed in claim 1, which has an oxygen permeability of less than 80 cm$^3$/m$^2$ bar d.

4. A film as claimed in claim 1, wherein the cover layer has a thickness of from 0.2 to 6 μm.

5. A film as claimed in claim 1, which has two layers and is composed of the base layer and the cover layer.

6. A film as claimed in claim 1, which has three layers and is composed of the base layer and a cover layer on each of the two sides of the base layer.

7. A film as claimed in claim 1, wherein at least one of the cover layers is pigmented.

8. A film as claimed in claim 1, which has been corona-treated on at least one side.

9. A film as claimed in claim 1, which is in-line coated on at least one side with a coating selected from the group consisting of adhesion promoting coatings antistatic coatings slip improving coatings and release coating.

10. A transparent, biaxially oriented polyester film having a base layer of at least 80% by weight based on the total weight of the base layer composed of at least one thermoplastic polyester, and having at least one cover layer, wherein the cover layer is composed of a polymer or a mixture of polymers which comprises at least 5% by weight of ethylene 2,6-naphthalate units and more than 40% by weight of ethylene terephthalate units; and, if desired, 0% up to 60% by weight of units from aliphatic, cycloaliphatic, or aromatic diols and/or optionally aliphatic, cycloaliphatic or aromatic dicarboxylic acids; with the proviso that the $T_g2$ value of the polyester film is above the $T_g2$ value of the base layer but below the $T_g2$ value of the cover layer.

11. A process for producing the film as claimed in claim 1, encompassing the steps:
   a) producing a film from base and cover layer(s) by coextrusion,
   b) biaxial orientation of the film and
   c) heat-setting of the oriented film.

12. A film as claimed in claim 1, wherein the cover layer comprises at least 70% by weight of ethylene 2,6-naphthalate units.

13. A film as claimed in claim 1, which has an oxygen permeability of less than 75 cm$^3$/m$^2$ bar d.

14. A film as claimed in claim 1, which has an oxygen permeability of less than 70 cm$^3$/m$^2$ bar d.

15. A film as claimed in claim 1, wherein the cover layer has a thickness of from 0.3 to 5.5 μm.

16. A film as claimed in claim 1, wherein the cover layer has a thickness of from 0.3 to 5.0 μm.

17. A film as claimed in claim 1, wherein the base layer makes up from about 40% to about 90% of a thickness of the polyester film.

* * * * *